Dec. 26, 1967   B. L. CARLSON   3,359,929
MOLDED PALLET
Filed April 18, 1966   2 Sheets-Sheet 1

INVENTOR.
BAYARD L. CARLSON
BY
ATTORNEY

Dec. 26, 1967     B. L. CARLSON     3,359,929
MOLDED PALLET

Filed April 18, 1966     2 Sheets-Sheet 2

INVENTOR.
BAYARD L. CARLSON
BY
ATTORNEY

United States Patent Office 3,359,929
Patented Dec. 26, 1967

3,359,929
MOLDED PALLET
Bayard L. Carlson, Portland, Oreg., assignor to Fibers, Incorporated, Vancouver, Wash., a corporation of Oregon
Filed Apr. 18, 1966, Ser. No. 543,200
8 Claims. (Cl. 108—58)

This present invention relates generally to a molded pallet and, more particularly, to a pallet member formed of molded fiber for supporting during transport sacks or boxes or other containers of load material for handling by fork-lift trucks, slings, and other conveyor means which may include moving belts, live rolls, or gravity rolls or the like.

It is an important object of this invention to provide an improved pallet member for supporting material loaded thereon which member is strong, light weight, inexpensive to produce, and capable of being stacked in nested manner by reason of its being formed of molded and bonded, reintegrated fibrous pulp.

Another object of the invention is to provide a molded fiber pallet which is formed in one piece, is of such configuration that it readily lends itself to interfitting for compact storage or shipment by reason of a nesting of one pallet with another.

A still further object is the provision of a molded fiber pallet designed and arranged for lifting and transport by means of a fork-lift truck while loaded in which pallet there are inherent and integral structural elements supplying support for heavy loads between the tines of a lift-fork and also capable of supporting those loaded portions of the pallet overhanging the lifting fork tines at the sides without material bending or fracture.

A still further object of the invention is to provide a molded fiber pallet in which there is a deck supported in spaced superposed relation to a floor, for example, by means of pedestals arranged to provide at least one pair of fork-receiving channels, and, preferably, two pairs of such channels disposed at right angles to each other.

Further objects and advantages of the instant invention will become more apparent during the course of the following detailed description in which is set forth a preferred embodiment of the invention. In the accompanying drawings is shown such a preferred embodiment as follows.

Figures 1, 2:
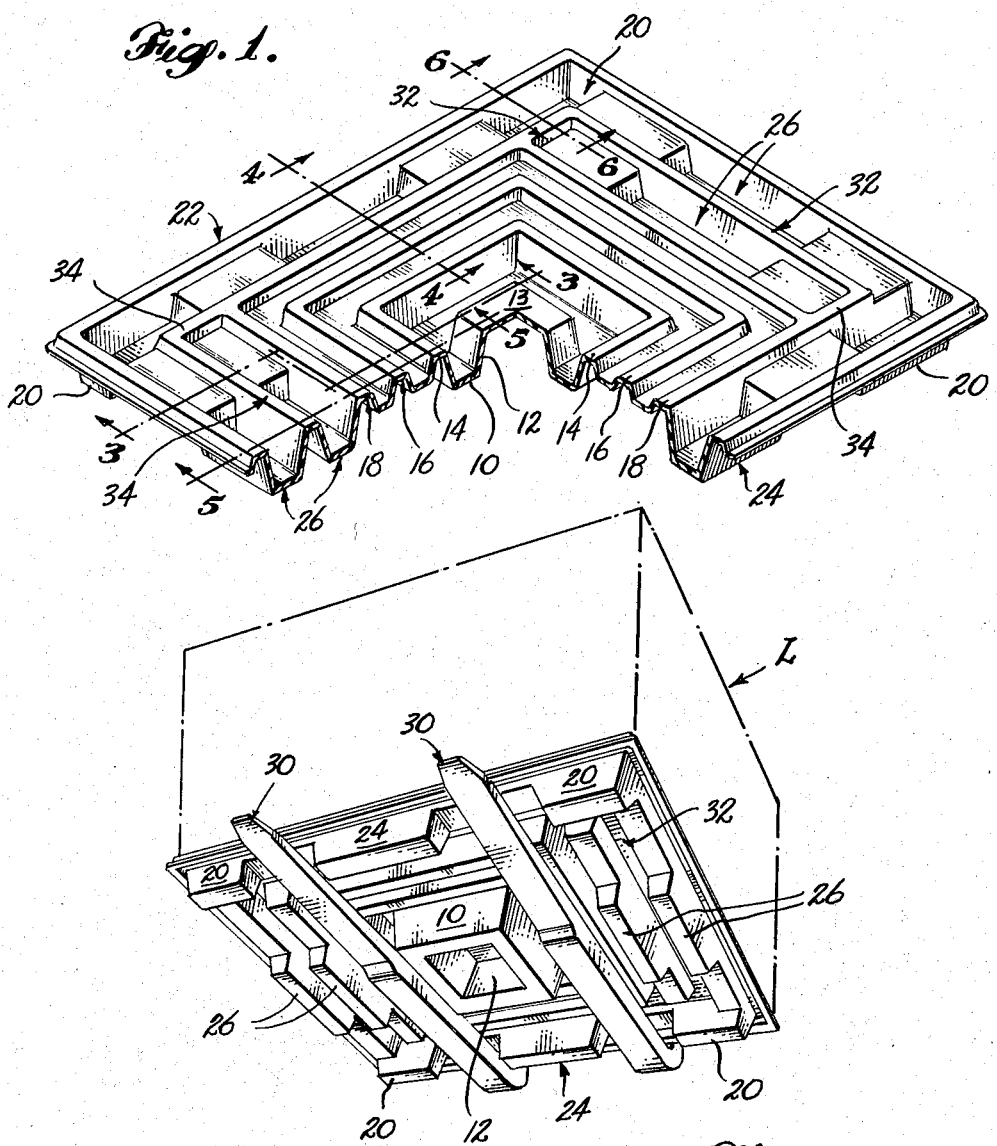
FIGURE 1 is a perspective view of the upper side of a molded fiber pallet according to the present invention with portions broken away and omitted for convenience of illustration.
FIGURE 2 is a perspective view of the under side of a molded fiber pallet as the same appears when lifted by the forks of a fork-lift truck.
Figure 3:
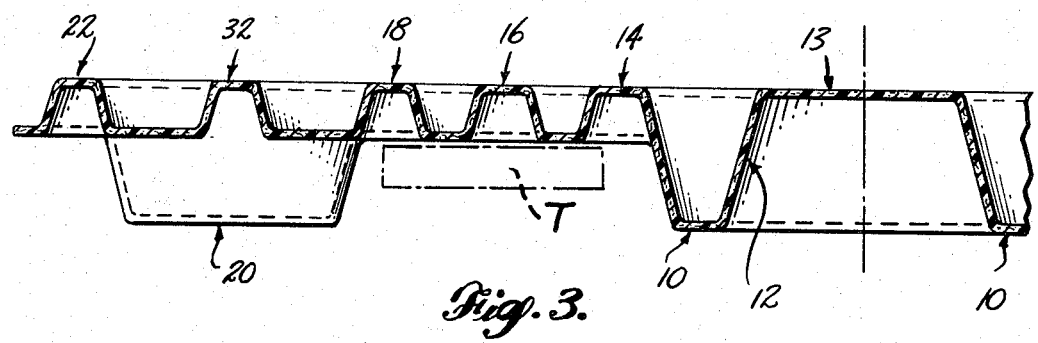
FIGURE 3 is a partial cross-sectional view in a large scale taken on line 3—3 of FIGURE 1.
Figure 4:
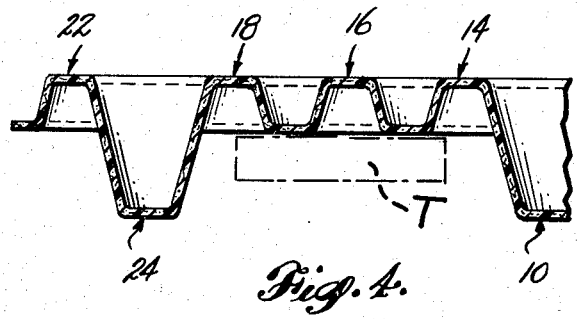
FIGURE 4 is an enlarged cross-sectional view taken on line 4—4 of FIGURE 1.
Figure 5:
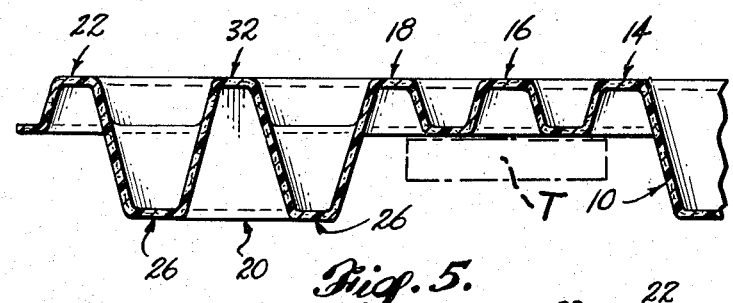
FIGURE 5 is an enlarged cross-sectional view taken on line 5—5 of FIGURE 1.
Figure 7:
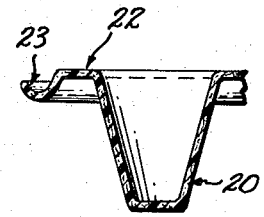
FIGURE 7 is a cross-sectional view similar to FIGURE 6 showing a modified form of marginal channel.
Figure 6:
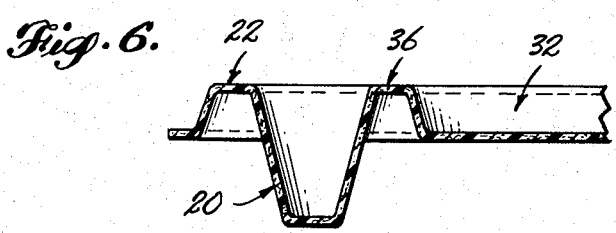
FIGURE 6 is a cross-sectional view taken on line 6—6 of FIGURE 1.

A molded fiber pallet according to this invention essentially comprises a rectangular deck having edge-supporting pedestals and a medially located pedestal extending therebelow an appreciable distance whereby the deck is supported in spaced relation above a floor a height sufficient for the interposition thereunder of the fork members of a lift truck. The edge-supporting pedestals and the medially located pedestal are arranged to provide therebetween at least one pair of fork-receiving channels. The deck includes a graduated series of rectangular corrugations which surround the medially located pedestal. The sreies of corrugations extend outward in surrounding relation to the central pedestal and terminate adjacent the edge-supporting pedestals. Preferably a marginal stiffening rib extends around the perimeter of the deck exterior of the edge-supporting pedestals to impart peripheral strength and to integrate the elements of the pallet as a unit.

The pallet is molded of reintegrated fibrous pulp so shaped that the opposite sides of the marginal rib, of the rectangular corrugations, and of the pedestals are hollow reflections of these positive elements. In other words, by reason of the pallet being molded it is a thin walled structure in which the thicknesses of all walls are substantially uniform throughout.

A desirable pallete size according to this invention includes a rectangular deck approximately 40″ x 48″, the upper surface of which is supported about 5″ above a floor or other surface by the pedestals. The shape of the corrugation and of the pedestals include tapered walls to facilitate release of the molded fibrous pulp from the mold or form; also to permit stacking and interfitting of parts between several pallets for compacting them for shipment, storage, and the like.

The pallet includes a medially located pedestal 10 having a general appearance of an inverted truncated pyramid hollow in the center by reason of cavity 12 formed therein providing a central boss 14 in the loading surface of the pallet of reverse configuration to that of pedestal 10. Rectangular corrugations 14, 16 and 18 surround the upper well of pedestal 10 and constitute a graduated series of rectangular stiffening ribs. The upper surfaces of corrugations 14, 16 and 18 establish the supporting plane of the pallet deck. The upper surface of boss 14 is preferably coplanar with the pallet deck. Hollow corner pedestals 20 are located adjacently outward from the rectangular corrugations 14, 16 and 18. Marginal supporting channel rib 22 extends around the perimeter of the pallet deck stiffening the same as well as integrating the pallet.

In the preferred form of the invention at the sides of the pallet and between the corner supporting pedestals 20 are intermediate edge-supporting pedestals 24 at opposite sides and pedestals 26, 26 at opposite ends, as shown from above and from below in FIGURES 1 and 2.

The arrangement of the corner and edge-supporting pedestals 20, 24 and 26, 26 provides fork-receiving channels beneath the loading deck. Preferably there are two pairs of such channels arranged at right angles to each other so that the tines 30, 30 of a fork-lift truck may be inserted under the deck from any of the four sides thereof.

An intermediate stiffening rib 32 extends between the paired end pedestals 26, 26 parallel to the outer corrugations 18. Rib 32 terminates at its ends approximately at the corner-supporting pedestals 20. A bridging rib 34 extends between the ends of the ribs 32 and the corners of the rectangular stiffening rib 18 as can be clearly seen in FIGURE 1.

It will be observed that when the lift-fork tines 30, 30 are interposed under the pallet deck, in either of the pairs of fork-receiving channels, they are disposed between the edge-supporting pedestals 20, 24 and the medially located hollow pedestal 10. Thus the work tines underlie portions of the graduated series of rectangular corrugations 14, 16 and 18, on which rests the middle portion of a load stacked on the pallet. Probably in most instances the fork truck engages and lifts the pallet by being inserted from the longer side of the pallet in the manner shown from beneath in FIGURE 2. Thus, that portion of the load on the pallet disposed outward of the tines 30, 30 must be carried in a cantilevered fashion relative the tines. By means of the supplemental supporting ribs 32, 32 and by reason of the supporting and rigidifying function of the edge-supporting pedestals 26, 26 it has been found that any tendency of the deck to bend downward at or closely adjacent the lifting tines 30, 30 is avoided. The bridging rib elements 34 likewise stiffen the deck in this extended direction and enhance the rigidity of the overall deck. A load resting on corrugations or ribs 14, 16 and 18 is transferred directly to the tine T of a fork lift by the upright walls forming said corrugations and the intermediate webs between said walls resting on the fork lift tines.

The upper surfaces of ribs 14, 16, 18, 22, 32 and 36 all lie in a common plane. Their bottom surfaces are approximately 1½″ therebelow. Conversely, the ground-engaging bottom surfaces of the pedestals 10, 20, 24 and 26, 26 likewise lie in a common plane, for example, and desirably between about 3½″ and 5½″ below the plane of the upper surface of the deck.

Pallets according to this invention are formed by depositing, by conventional vacuum-molding techniques, the fiber in a pulp slurry in and on a mold which is preferably the mirror image of the underside of the pallet as seen in FIGURE 2. During deposit of the fiber from the slurry, suction is imparted to such a mold drawing the fiber into intimate contact with all of the corners and shapes of the mold and producing a deposit of such fiber of a substantially uniform thickness entirely over the surface of the mold. A resinous or other suitable binder material may be included in the slurry to bind together the fibers and enhance the strength of the pallet. Customarily after molding the pallet is dried under conditions including elevated temperature and pressure to expedite the removal of water and, where required, as with thermosetting binders to convert the resins or other binder material into substantially insoluble infusible state. The binder materials intimately weld the pulp fiber elements together. When a thermosetting resin is employed it has been found that the same precipitates on the fibers particularly where there is fiber-to-fiber contact and the same are welded or bonded together. A porosity nevertheless exists in the bonded pallet. Interstices between the fibers after the pallet has been dehydrated may further be filled by an impregnating liquid resin by immersing the pallet in a bath thereof. Alternatively thermoplastic compounds in molten state may be deposited throughout the pallet and upon their cooling and drying consolidate the entire fiber mat.

In FIGURE 2, in dotted lines, a load L of right rectangular shape is shown. This load can comprise boxes of goods to be transported stacked on the pallet. Ordinarily such are secured by conventional metal strapping, banding or in any other suitable manner which, of course, extends around the load and pass through the fork-receiving channels beneath the pallet from opposite directions. It will be understood, however, that the use of the pallet is not restricted to cases or cartons, but may also be used to transport sacks, or otherwise packaged materials to be shipped on the pallet.

While it is intended that these pallets be one-use pallets that travel with goods in shipment from a production source to a distribution warehouse or ultimate point of use, it will be obvious because of the inherent strength of the pallet they may be after one such use accumulated, stacked and re-banded for return for additional uses. Also in the first instance of movement from the source at which the pallets are produced they may be compactly stacked and banded in groups and thus shipped with a considerable savings in bulk space as compared with the conventional wooden pallets widely used at this time. A pallet 40″ x 48″ and approximately 5″ high has a weight of about 14 pounds. The wall thicknesses may be from about ⅛″ to about ⅜″.

Since the pallet is molded in a die which is the mirror image of the underside of the pallet it is preferable that the walls of the recesses in the die which produce molding of the pallet be sloped to facilitate release of the pallet from the mold. As a result, all under surfaces of the pallet have a taper as shown, and because of the substantially uniform thickness of wall in the various elements of the pallet, this is reflected in the upper surface of the pallet. It is by reason of these tapered configurations that nesting of the pallets one upon another is accomplished. A bundle of 50 pallets, each having a dimension from the deck to the bottom of a pedestal of 3½″, when stacked and nested will have an overall height of approximately 55″. This shows what a considerable savings in space is possible as compared with pallets being shipped for use.

It will be readily apparent to those having ordinary skill in the pertinent art that various changes and modifications may be made in the details of the above described preferred embodiment of this molded fiber pallet. All such as fairly fall within the spirit and scope of this invention as defined by the subjoined claims, having due regard to a liberal application of the doctrine of equivalents shall be deemed encompassed by this patent.

What is claimed is:

1. A molded fiber pallet, comprising:
   a rectangular deck of molded sheet material having a continuous marginal stiffening inverted channel forming the perimeter thereof;
   edge-supporting and corner-supporting hollow pedestals formed integral with said deck and located inwardly adjacent said marginal channel, said pedestals extending below said deck an appreciable distance whereby to support the lower side of said deck in spaced relation above a base surface;
   a medially located hollow square pedestal formed integral with said deck and extending therebelow coextensive with said edge-supporting pedestals; and
   a graduated series of continuous rectangular corrugations formed in said deck coplanar on their upper surfaces with said marginal stiffening channel and having upright walls located in surrounding relation to said medially located pedestal, said corrugation series terminating inwardly adjacent said edge-supporting pedestals;
   said edge-supporting and corner-supporting pedestals and said medially located pedestal being arranged to provide therebetween at least one parallel pair of fork-lift tine-receiving channels beneath said deck in underlying relation to opposed portions of said corrugations.

2. The pallet structure according to claim 1 in which the deck is longer in one dimension than the other and there is a rib corrugation located parallel between each of the shorter portions of said marginal channel and the inwardly adjacent graduated series of rectangular corrugations.

3. The structure of claim 2 in which there is an integral bridging corrugation between each end of said rib corrugation and the nearest corner of the outermost of said graduated series of rectangular corrugations.

4. The structure according to claim 1 in which the molded sheet material comprises reintegrated and rigidified fibrous pulp.

5. The structure according to claim 4 in which the fibrous pulp is cellulosic in origin.

6. The structure according to claim 1 in which the medially located pedestal includes a central column rising to the plane of said deck.

7. The structure according to claim 2 in which there is a parallel pair of hollow edge-supporting pedestals located inward of each shorter edge of said deck.

8. The structure according to claim 1 in which said series of rectangular corrugations are three in number and said upright walls are substantially normal to supporting fork-lift tines.

(References on following page)

References Cited

UNITED STATES PATENTS

| | | | |
|---|---|---|---|
| 2,991,965 | 7/1961 | Drieborg | 108—58 |
| 3,007,663 | 11/1961 | Huck | 108—57 |
| 3,140,672 | 7/1964 | De Luca | 108—53 |
| 3,167,341 | 1/1965 | Higgins | 294—67 |
| 3,187,689 | 6/1965 | Hess | 108—58 |
| 3,187,691 | 6/1965 | Leitzel | 108—58 |
| 3,228,358 | 1/1966 | Sere et al. | 108—58 |

BOBBY R. GAY, *Primary Examiner.*

FRANK B. SHERRY, *Examiner.*

G. O. FINCH, *Assistant Examiner.*